United States Patent
Vasconcelos et al.

(10) Patent No.: US 11,326,931 B2
(45) Date of Patent: May 10, 2022

(54) MOBILE AND MODULAR DEVICE WITH MOVABLE WALLS FOR DYNAMIC WEIGHING OF A BOVINE ANIMAL

(71) Applicant: ROBERT BOSCH LIMITADA, Campinas-SP (BR)

(72) Inventors: Alvaro Augusto Vasconcelos, Campinas-SP (BR); Gustavo Henrique Ferro dos Santos, Paulinia-SP (BR); Felipe Magno dos Reis, Campinas-SP (BR)

(73) Assignee: ROBERT BOSCH LIMITADA, Campinas-SP (BR)

( * ) Notice: Subject to any disclaimer, the term of this patent is extended or adjusted under 35 U.S.C. 154(b) by 152 days.

(21) Appl. No.: 16/719,061

(22) Filed: Dec. 18, 2019

(65) Prior Publication Data
US 2020/0209048 A1 Jul. 2, 2020

(30) Foreign Application Priority Data
Dec. 19, 2018 (BR) .......................... 102018076548-5

(51) Int. Cl.
*G01G 17/08* (2006.01)
*A01K 11/00* (2006.01)
*G01G 19/52* (2006.01)

(52) U.S. Cl.
CPC ............ *G01G 17/08* (2013.01); *A01K 11/006* (2013.01); *G01G 19/52* (2013.01)

(58) Field of Classification Search
CPC ...................................................... G01G 17/08
See application file for complete search history.

(56) References Cited

U.S. PATENT DOCUMENTS 374,927 A * 12/1887 Boulton ................. G01G 17/08
119/511
1,034,622 A * 8/1912 Johnson ................. G01G 17/08
119/511

(Continued)

FOREIGN PATENT DOCUMENTS

BR  102015026489-5 A2  5/2017
BR  102015032319-0 A2  6/2017

(Continued)

OTHER PUBLICATIONS

Machine translation of KR-20100011278-A (Year: 2010).*

*Primary Examiner* — Natalie Huls
(74) *Attorney, Agent, or Firm* — Micheal Best & Friedrich LLP

(57) ABSTRACT

A mobile and modular device with movable walls for the dynamic weighing of a bovine animal includes an identification module having a support structure, a processing module, a solar panel, an antenna and an identifier; and a weighing module including a base, a pair of side walls, a weighing platform, a pair of load cells and an amplifier and transmission box. The processing module, the identifier, the solar panel and the antenna are associated on the support structure. The weighing platform, the pair of load cells and the amplifier and transmission box are associated on the base in a fixed way. Each one of the pair of side walls contains a fixed portion and a mobile portion; and each one of the lower ends of the fixed portion contains a mechanism, which is associated to the base in a mobile way, through a first distal end and a second distal end.

11 Claims, 8 Drawing Sheets

(56) References Cited

U.S. PATENT DOCUMENTS

| | | | | |
|---|---|---|---|---|
| 1,047,725 | A * | 12/1912 | Worthington | G01G 17/08 119/511 |
| 1,348,343 | A * | 8/1920 | Zimmerman | G01G 17/08 119/511 |
| 3,074,497 | A | 1/1963 | Hawbaker | |
| 3,726,353 | A * | 4/1973 | Christensen | G01G 17/08 177/208 |
| 3,774,704 | A * | 11/1973 | Purcell | G01G 17/08 177/126 |
| 4,427,083 | A * | 1/1984 | Muddle | G01G 17/08 177/132 |
| 4,470,471 | A * | 9/1984 | Mills | G01G 21/12 177/132 |
| 4,850,441 | A * | 7/1989 | Mosdal | G01G 17/08 177/136 |
| 4,905,780 | A | 3/1990 | Goff, III | |
| 4,984,644 | A | 1/1991 | Skibinksi | |
| 5,111,897 | A | 5/1992 | Synder et al. | |
| 5,734,128 | A * | 3/1998 | Gades | G01G 17/08 177/132 |
| 6,555,767 | B1 * | 4/2003 | Lockery | G01G 3/1412 177/211 |
| 6,805,078 | B2 | 10/2004 | Zimmerman et al. | |
| 6,868,803 | B1 | 3/2005 | Huisma et al. | |
| 7,129,423 | B2 | 10/2006 | Baarsch et al. | |
| 8,588,476 | B1 * | 11/2013 | Spicola, Jr. | A01K 29/00 382/110 |
| 2009/0178859 | A1 * | 7/2009 | Kleinsasser | G01G 17/08 177/108 |
| 2018/0313686 | A1 * | 11/2018 | Ribeiro, Jr. | G01G 23/005 |
| 2020/0240828 | A1 * | 7/2020 | Vasconcelos | G01G 21/28 |
| 2020/0319014 | A1 * | 10/2020 | Mitchell | A01K 5/0107 |
| 2021/0007330 | A1 * | 1/2021 | Huisma | G06Q 10/06315 |

FOREIGN PATENT DOCUMENTS

| | | |
|---|---|---|
| BR | 102017006913-3 A2 | 10/2018 |
| BR | 102017028286-4 A2 | 7/2019 |
| CN | 203364938 U | 12/2013 |
| CN | 205719200 U | 11/2016 |
| CN | 106918381 A * | 7/2017 |
| CN | 206683739 U | 11/2017 |
| DE | 202013000096 U1 | 2/2013 |
| EP | 3173751 A1 | 5/2017 |
| JP | H04-309823 A | 11/1992 |
| KR | 20100011278 A * | 2/2010 |

* cited by examiner

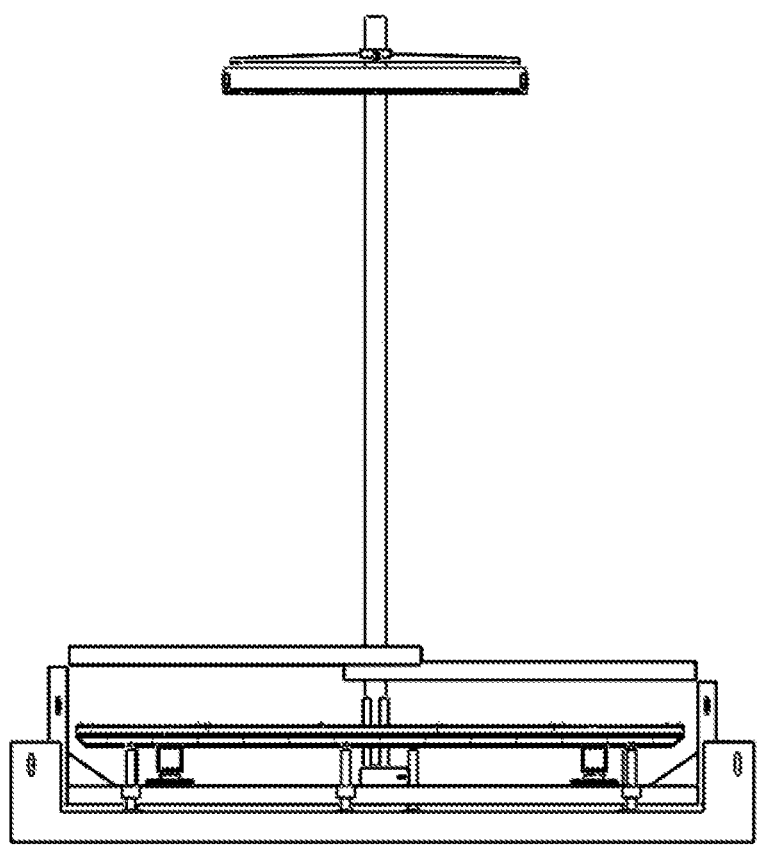
Figure 2.1

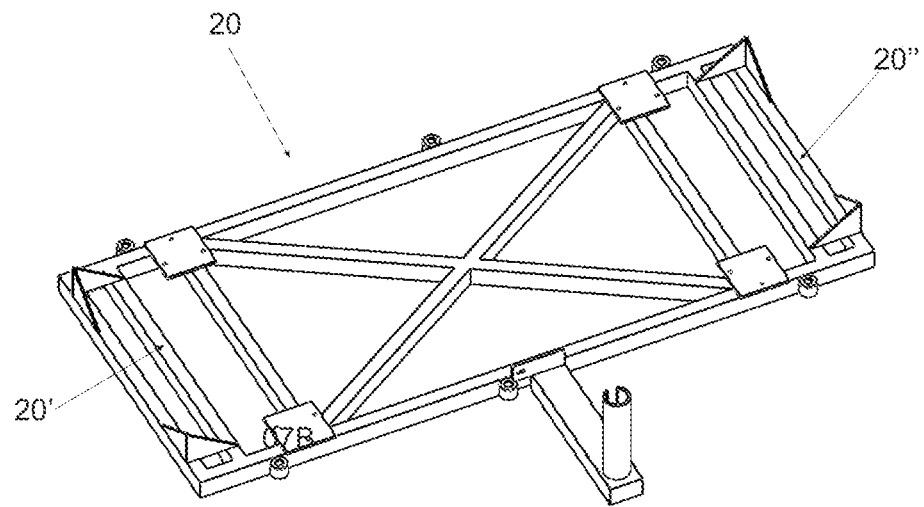
Figure 2.2
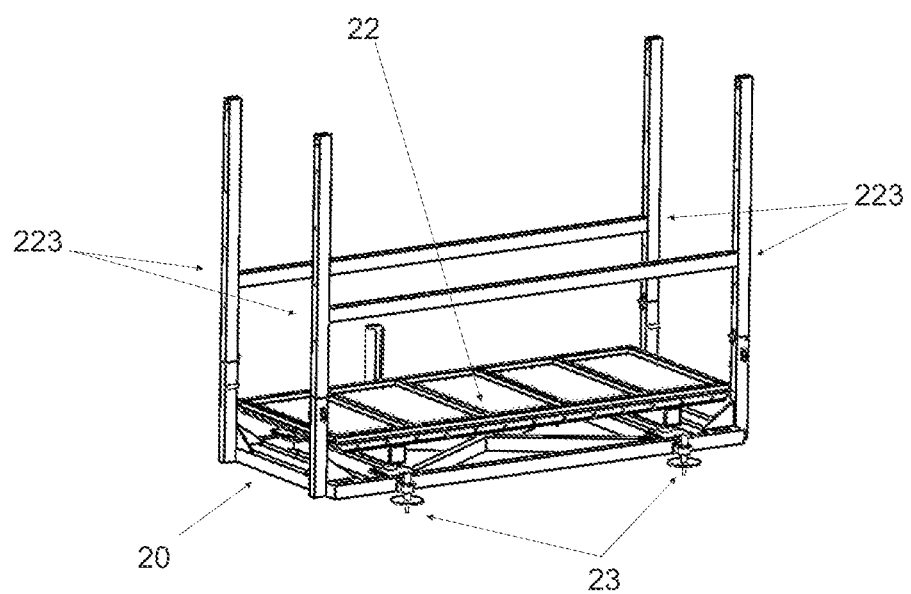
Figure 2.3

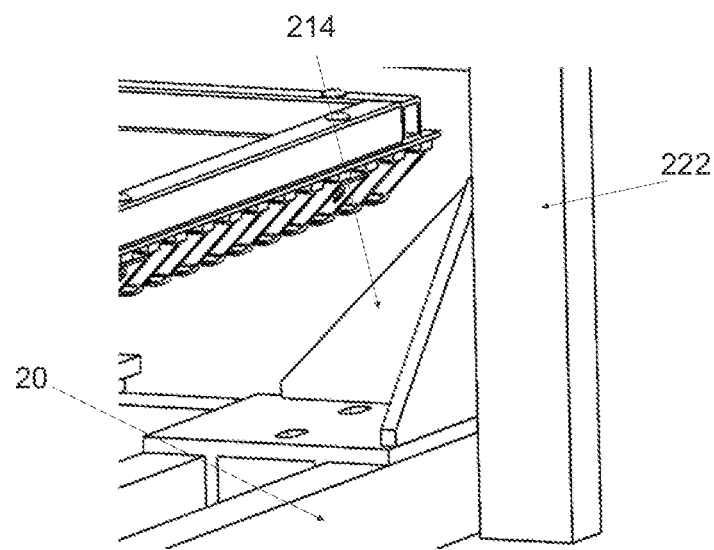
Figure 2.4
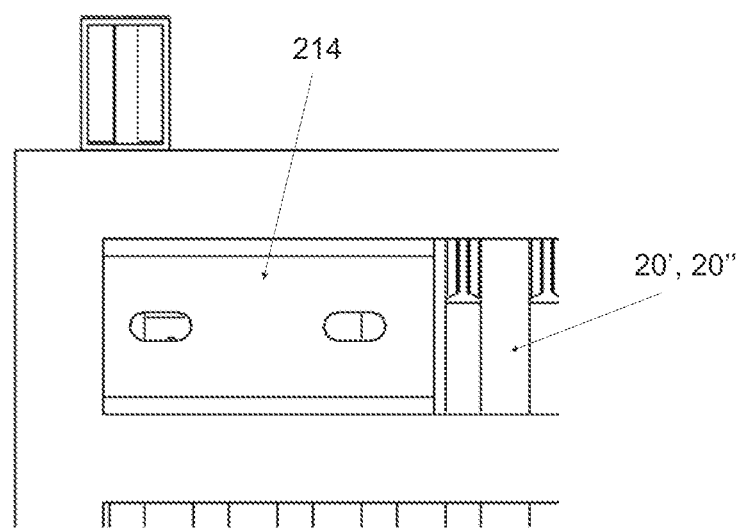
Figura 2.5

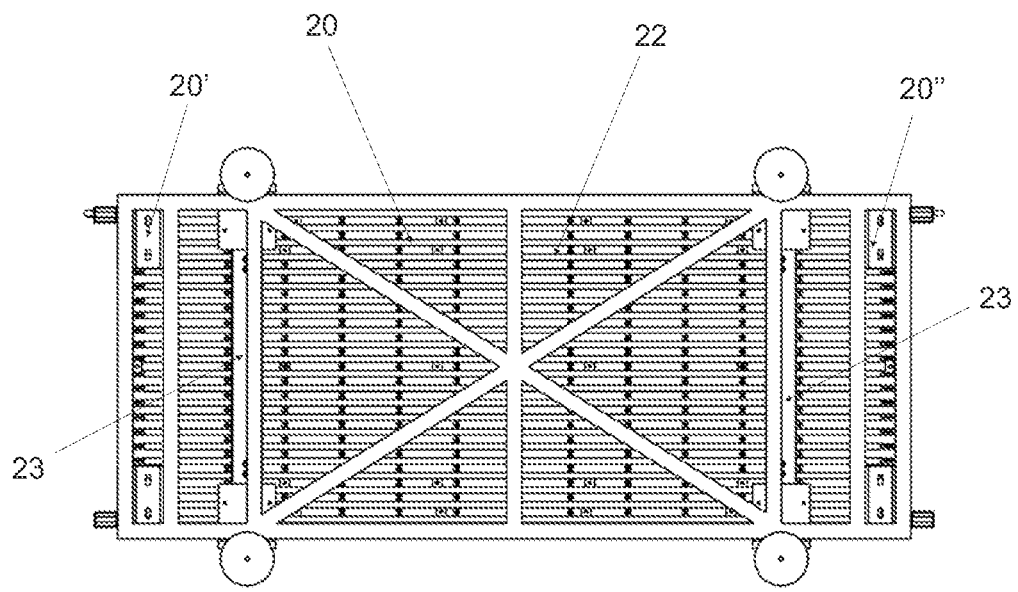
Figure 2.6
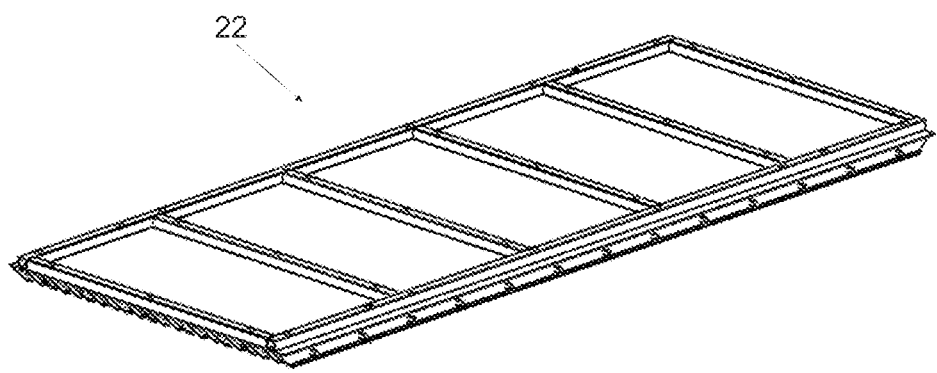
Figure 2.7

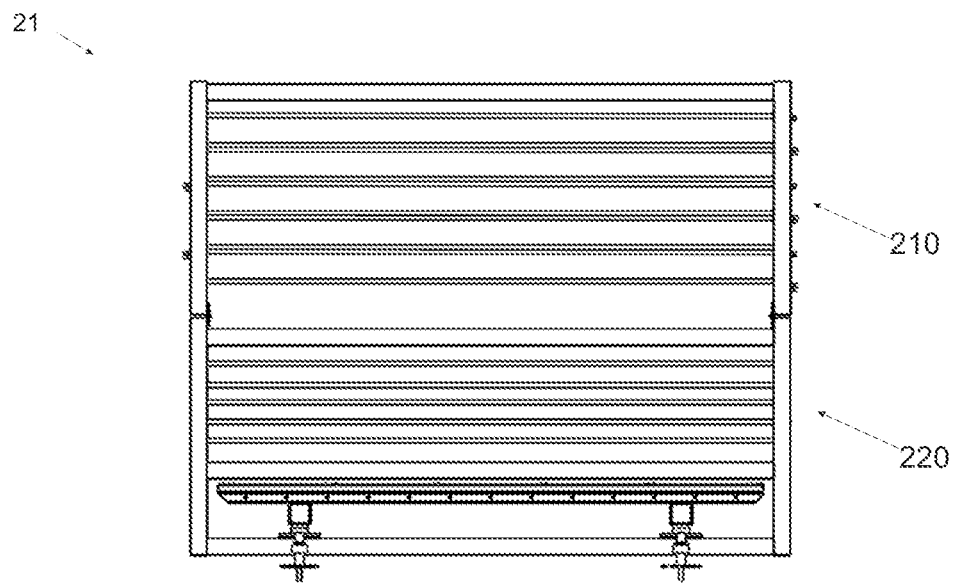
Figure 2.8
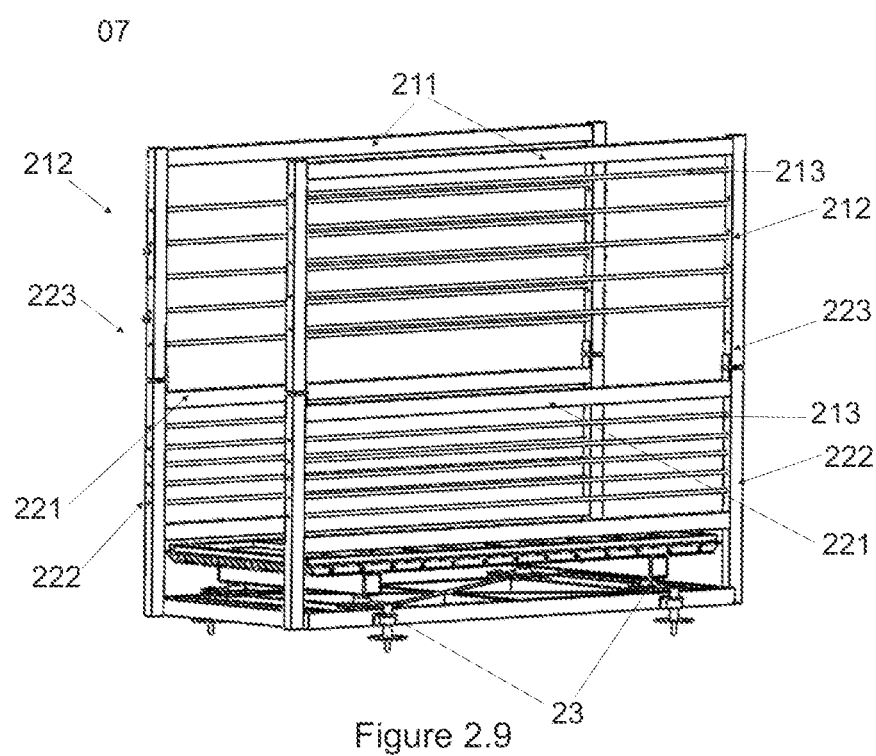
Figure 2.9

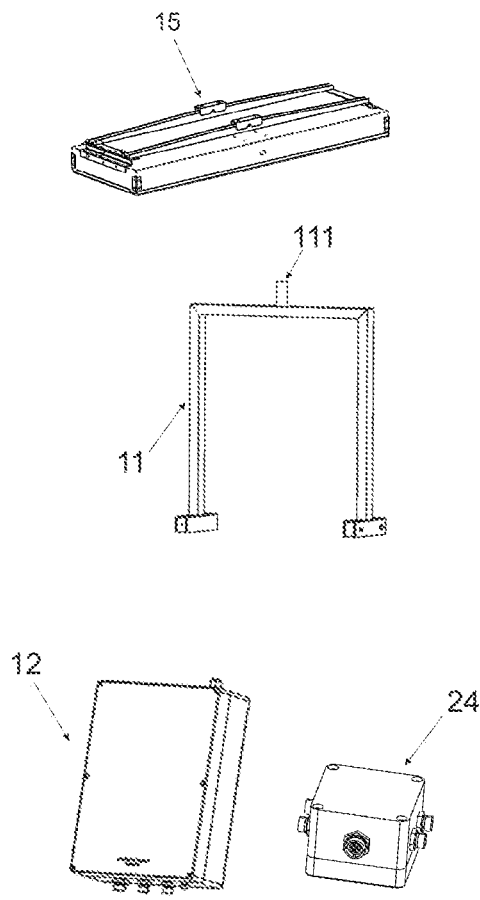
Figure 3.1
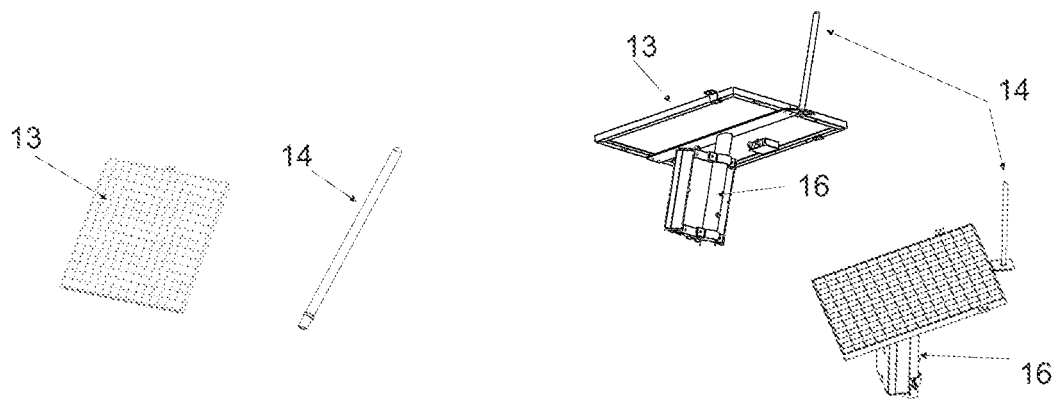
Figure 3.2
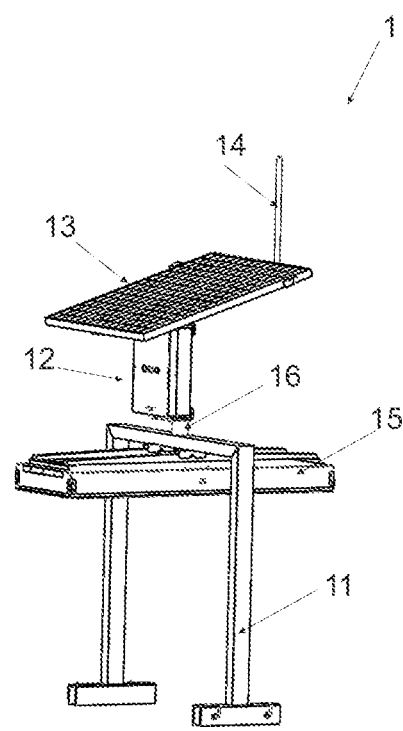
Figure 3.3

MOBILE AND MODULAR DEVICE WITH MOVABLE WALLS FOR DYNAMIC WEIGHING OF A BOVINE ANIMAL

BACKGROUND OF THE INVENTION

The present invention refers to a mobile device with movable walls designed for the dynamic weighing of animals.

The invention is precisely designed for a mobile and modular device with movable walls for the dynamic weighing of animals, for example cattle, which makes it possible to guarantee the provision of the precise weight of each animal passing over the scales, without limitation of the ox size and, without the animals having to move to another area through a passage formed between the two areas.

It is important to note that in the livestock-farming sector, there is a need to weigh the cattle, among others, with the aim of monitoring the growth and consequently its weight. As such, cattle are usually driven through passages that limit the animal's locomotion possibility, such as, for example, a passage formed between two areas where the animal is located. A scale is installed in this passage in such a way as to guarantee that each animal transiting between the two areas passes over the scale.

As known from the state of the art, various solutions have been developed in an attempt to solve the problem of weighing animals, such as the one presented in document JP 4309823, which describes a dynamic weighing system, in which the weighing data are leveled and processed in order to calculate a periodicity.

Document BR 10 2015 026489-5, by the applicant itself, describes an animal weighing platform with a plate, a load cell, an accelerometer fastened on the plate and a processing unit capable of identifying and processing the data provided by at least one load cell, wherein the cell includes a diagnosis module capable of identifying and processing the data provided by the accelerometer.

Document BR 10 2017 028286-4, also by the applicant itself, describes a device for identifying the passage of animals, which is installed in passage areas defined by streets of a rural property, the device presenting a simplified constructive arrangement, capable of covering from narrow areas of passage to wider areas of passage, having excellent signal coverage, due to the reduced height of the installation.

Document BR 10 2017 006913-3 describes an automatic, voluntary weighing system comprising a system for monitoring and managing animals and an apparatus that includes weighing platforms strategically installed near to drinking fountains constituting a constant and voluntary total weighing system of each animal stationed over the platform and an evaluation of the dynamics of water ingestion throughout the day.

However, as can be seen, it is not observed in the state of the art, a mobile and modular device for the dynamic weighing of animals, capable of providing the precise weight of each animal passing over the scale, wherein the weighing may occur both when the animal stops on the scale and when it moves over it, and mainly with mobile characteristics, without the need for the animals to move to a specific area, for example drinking fountains, and mainly by having the flexibility to adjust to various width sizes of animals, due that its walls are mobile or adjustable.

SUMMARY OF THE INVENTION

The purpose of the present invention is to obtain a mobile and modular device with movable walls for the dynamic weighing of animals, capable of providing the precise weight of each animal passing over the scale, wherein the weighing may occur both when the animal stops on the scale and when it moves over it, and mainly with mobile characteristics, without the need for the animals to move to a specific area, for example drinking fountains, and mainly by having the flexibility of adjusting to various animal sizes, for example, some having a larger body structure than others, due that its walls are mobile or adjustable, improving with this the known devices.

Indeed, the objective of the invention is to provide a mobile and modular device with movable walls for the dynamic weighing of a bovine animal, the device including:

an identification module including a support structure, a processing module, a solar panel, an antenna and an identifier; and a weighing module including a base, at least a pair of side walls, at least a weighing platform, at least a pair of load cells and at least an amplifier and transmission box;

wherein the processing module, the identifier, the solar panel and the antenna are associated on the support structure; and wherein the at least a weighing platform, the at least a pair of load cells and the amplifier and transmission box are associated on the base in a fixed way; and wherein each one of the at least a pair of side walls contains a fixed portion and a mobile portion; and each one of the lower ends of the fixed portion contains a mechanism, which is associated to the base in a mobile way, through a first distal end and a second distal end.

Additionally, the invention exploits the fact that the at least a movable side wall with a fixed portion and a mobile portion, where each fixed portion comprises at least a central longitudinal cross bar, at least a cable and at least a pair of side cross bars fixed perpendicularly in relation to the base, and where each mobile portion comprises at least an upper cross bar, at least a pair of movable side cross bars and at least a cable.

The device according to the present invention does not require the animal to be stationary on the weighing platform because it is not about measurement of frequency or periodicity of passage of the animal. To obtain a reliable measure of the animal's weight, it is enough that the device has the dimension to accommodate all the animal's paws on its weighing platform.

BRIEF DESCRIPTION OF THE DRAWINGS

The invention is described in detail below in terms of a preferred implementation, exemplified by the figures, wherein:

FIG. 2.1 is a perspective view of a first development stage of the object of the present invention;

FIG. 2.2 is a perspective view of the base, component of the weighing module;

FIG. 2.3 is a perspective view of the weighing module, mounted with some components;

FIG. 2.4 is a perspective view of a detail of FIG. 2.3 illustrating the mechanism, component of the weighing module;

FIG. 2.5 is a bottom view of a detail of FIG. 2.3 illustrating the mechanism, component of the weighing module;

FIG. 2.6 is a bottom view of the device, detailing some components of the weighing module;

FIG. 2.7 is a perspective view of the platform, component of the weighing module;

FIG. 2.8 is a side view of the movable side wall, component of the device, object of the present invention;

FIG. 2.9 is a perspective view of the weighing module with all its components;

FIG. 3.1 is a blown-up perspective view of the components of the identification module, part of the object of the present invention;

FIG. 3.2 is a perspective view of some mounted components of the identification module;

FIG. 3.3 is a perspective view of the identification module with all the components mounted.

DETAILED DESCRIPTION

It is important to note that the use of a system for weighing animals in a stationary manner is already known in the state of the art. However, it is possible to verify that the use of this weighing system does not allow the mobility of this system, since the accommodation and/or positioning of this system needs to be fixed at a specific site, not enabling for example the transfer to another place, nor can it be used by animals of varied sizes.

Figure 1:
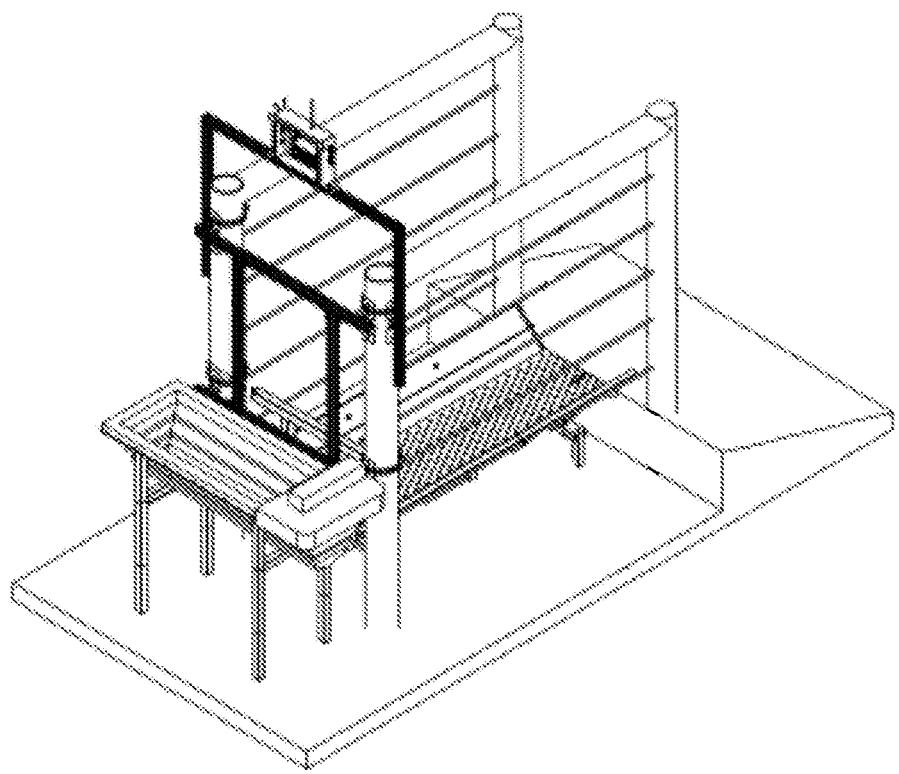
FIG. 1 is a perspective view of an automatic weighing device from the state of the art.

FIG. 1 represents a system for weighing animals from the state of the art, which specifically uses a platform with side flaps, an entry ramp, fixed moors and a square for the animal to position its head.

The present invention, in turn, was designed to allow the movement of the mobile and modular device with movable walls for the dynamic weighing of animals 100, in order to eliminate the need of transfer or movement between pastures for the weighing of animals of varied sizes. In other words, the objective of the present invention has always been to give mobility to the system and make it more useful for the farmer, so he/she can use it many times, measuring the weight of the cattle at different production sites and animals of varying sizes.

However, it is important to clarify that up to the definition of the preferred implementation of the device 100, object of the present invention, some other solutions were produced, where in a first attempt a structure or weighing module 2 was developed, including a foldable mechanical system with movable walls and easy to mount.

The weighing module 2 was designed containing a set of fully foldable galvanized steel frames, which facilitates the transport, storage and assembly. In this weighing module 2, the mechanical part contains a rectangular base 20 with four fixing level screws to guarantee that the entire side of the scale is at the same level in relation to the ground, as can be seen in FIG. 2.2. Base 20 further comprises a first distal end 20' and a second distal end 20", the two ends 20' and 20" serving as guides for sliding the side walls 21 in the sideward direction of the base 20, through mechanism 214 and thereby allowing different openings in the gap contained between the two side walls 21.

It is possible to verify through FIG. 2.3 that the walls of the weighing module 2 were made with the same galvanized steel frames of the base 20, wherein most of the frames were produced in a foldable arrangement, enabling their disassembly. In the structure of base 20, a pole holder was also idealized, besides sealing devices with the aim of filling the gap between the structure and the platform, whereby helping to keep the load cells 23 clean, since the cells 23 are located beneath the platform 22.

In the attempt to build device 1, it was also designed that identifier 15, which is responsible for the RFID reading, was mounted on a tube, which in turn, was connected to a pole holder, this fixed at base 20. Additionally, the processing module, also known as field box, was coupled to the same tube. Moreover, the processing module 12 contains the transmitter responsible for sending the collected data to the software in the cloud, from the applicant, Bosch. Thus, this fully-integrated system functions so as to read the RFID label, collect the weight of the cattle and send it to the cloud. After this process, the collected information is made available on an application/software of the applicant, which can be accessed by the user on his/her cellphone, computer or tablet.

However, the precision livestock system for farm management will only function correctly if the cattle cross the scales in the right direction. Because of this, currently, wooden fence posts are installed around the module, to solve this problem.

In order to maintain the mobility characteristic of the system, this first version of the device 100 has steel cables 213, coupled on the side walls 21 in order to create fences fixed on the mechanical structure itself and thus, once the cables 213 are fixed on the side walls 21 and, then, crossed on these bars, the cables 213 prevent the cattle from crossing the platform 22 by the wrong sides and/or in the wrong direction.

Still in relation to device 100, when it is folded or dismounted, all the walls 21 are reclined horizontally, leaving the structure more compact, thus facilitating its transport.

However, for this first version of device 100, the need to do a complete earthwork (foundation) was identified to stabilize the structure in the soil. Considering that the first version of device 100 needed earthwork and, in order to simplify this process, an optional alternative was created, using a concrete base structure added to the mechanical structure to level it with the ground. Therefore, the mechanical structure was added to the concrete base, which besides improving stability, also permits movement to different production sites.

In order to enable a safer transport of device 100 and also guarantee that identifier 15 is not damaged by the animals, intentionally or accidentally, in a second stage it was verified the possibility of improving the positioning of the identifier 15. To this end, it was used the concept of adding various components in a single part, and a support structure 11 was thus idealized, which enables the association of a support 16 and identifier 15. It is worth noting that the support 16 enables, in turn, the association of the processing module 12, of the solar panel 13 and of the antenna 14, and thereby and jointly with the support structure 11 and with the identifier 15, form identification module 1, as can be seen in FIGS. 3.1 to 3.3.

Still in relation to the second development stage of device 100, the weighing module 2 was modified to improve the design. The developed weighing module 2, still includes a foldable mechanical system, easy to be mounted with the same base 20 and with the new identification module 1.

This new identification module 1, which contains the support structure 11, the processing module 12, the solar panel 13, the antenna 14 and the identifier 15, was installed on the top of the weighing module 2.

Figure 4:
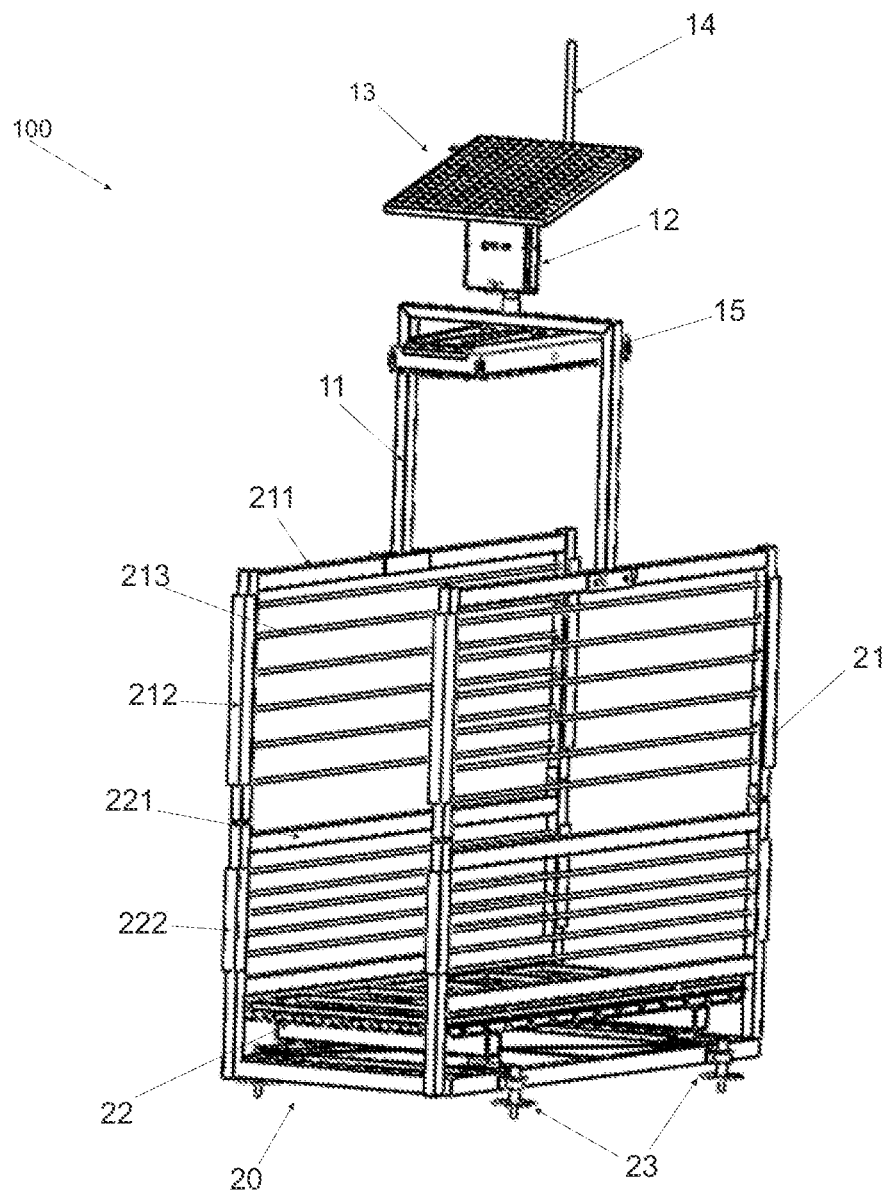
FIG. 4 is a perspective view of the mobile and modular device with movable walls for the dynamic weighing of animals, object of the present invention.

Still in relation to the identification module 1, specifically on the support structure 11, its geometry resembles that of an easel, with the objective to support the electronic components, the processing module 12, the solar panel 13 and the antenna 14. Like the whole device 100, the support structure 11 is made with galvanized steel structures, and is coupled above the two upper parallel cross bars 211, of the weighing module 2, as can be seen in FIG. 4.

Essentially, and as can be seen mainly in FIGS. 3.1 and 3.3, the support structure 11 includes three small bars, two of which are vertical and parallel to the weighing module 2 and a cross bar connecting the two bars, wherein this cross bar has an stretching mechanism 110 which enables the gap to be opened, according to the accommodation required in the side walls 21, shaped like an easel frame. Additionally, this support structure 11 can easily be pivoted or even dismounted simply by unscrewing the screws fastened on the upper cross bars 211.

Thus, the identifier 15, also known as RFID reading system, was mounted on the upper part of this support structure 11, located in the middle of the cross bar or upper bar. It is also important to note that on the support structure 11 there is also a tube 111, which is a support to position the support 16 and consequently the processing module 12, the solar panel 13 and the antenna 14. Therefore, the verticalization of this entire module has made it possible to improve the design, making it more compact and lightweight. This is because the tube used and developed as support for the RFID system for the first stage was very heavy and dangerous. Then, in the second stage it was modified for this new support structure 11, so as to facilitate the transport. Additionally, this support structure 11 is useful for leveling the side walls 21 of the entire device 100.

Finally, in this second stage, two central longitudinal cross bars 221 were added, one on each side wall 21 of the weighing module 2, also made of galvanized steel, wherein each one was disposed between two side fixed cross bars 222 at base 20 of device 100. Thus, these new central longitudinal cross bars 221 improved the resistance of the structure and limited the movement of the fixed side cross bars 222 on its axial shaft. Additionally, when device 100 is dismounted, the two mobile side cross bars 212 are pivoted/folded, nevertheless, the fixed side cross bars 222 and cables 213 mounted between the two fixed side cross bars 222 and base 20 will be intact. Consequently, once this system has been assembled, these cables 213 do not need to be calibrated again.

In a preferred implementation, the device 100, object of the present invention, includes two main modules, the first called identification module 1 and the second called weighing module 2. The identification module 1 comprising an RFID reading system, and encompassing the electronic components used in the device, it being responsible for identifying the bovine animal and for transmitting the information to a management system, as idealized by patent application BR 10 2015 032319 0.

As can be seen in FIG. 3.3 and FIG. 4, the preferred implementation of the mobile and modular device 100 with movable walls for the dynamic weighing of cattle, object of the present invention, includes an identification module 1 and a weighing module 2, the identification module 1 includes a support structure 11, a processing module 12, a solar panel 13, an antenna 14, and an identifier 15; and the weighing module 2 includes a base 20, at least a pair of side walls 21, at least a weighing platform 22, at least a load cell 23, and at least an amplifier and transmission box 24.

Specifically in relation to the support structure 11 of the identification module 1, it has the following dimension: width or opening comprised between 650 and 850 mm, height of 850 mm, tube for fitting the support 16 with a diameter of 40 mm, dimensions to enable the association of the support structure 11 through the mobile portion 210 of the side wall 21, to the weighing module 2. More over the other, it is important to emphasize that the support structure 11 is associated with the upper cross bar 211 in a pivoting mode.

FIG. 3.3 also enables the visualization that the processing module 12, the identifier 15, the solar panel 13 and the antenna 14 are associated on the support structure 11; and more specifically that the processing module 12, the solar panel 13 and the antenna 14 are fixed to the support 16, and the support 16 in turn is associated to the support structure 11 through the tube 111.

In relation to the weighing module 2, and as can be seen in several figures, including FIG. 4, the module basically includes at least a pair of side walls 21, at least a weighing platform 22, at least a pair of load cells 23, an amplifier and transmission box 24, and by mechanisms 214, these components being associated to base 20.

FIGS. 2.8 and 2.9 illustrate the basic arrangement of each one of the at least a side wall 21, which comprises a fixed portion 220 and a mobile portion 210. Wherein each fixed portion 220 comprises at least a central longitudinal cross bar 221, at least a cable 213 and at least a pair of fixed side cross bars 222 perpendicular to base 20. Each mobile portion 210 comprises at least an upper cross bar 211, at least a pair of mobile side cross bars 212 and at least a cable 213. In the preferred implementation of device 100, object of the present invention, the fixed portion 220 of each side wall 21 comprises four cables 213, which enable not only to prevent the animals from crossing the device 100 in the wrong direction but also assists the structure of the side wall 21.

Moreover, and still in relation to the side wall 21, each side wall 21 is longitudinally associated at the first distal end 20' and at the second distal end 20" of base 20 through two mechanisms 214 arranged on at least a pair of fixed side cross bars 222 at the opposite end of the at least an upper cross bar 211. It is also important to note that the mobile portion 210 is associated with the fixed portion 220 in a pivoting mode, at the end of the fixed side cross bars 222 opposite to the base 20.

Additionally, the mobile portion 210 also comprises at least a rod 221 arranged between the at least a pair of mobile cross bars 212, making wall 21 to be vertically parallel and the cables 213 stretched, and thereby enabling the perfect fitting of the upper cross bar 211. In the preferred implementation, each mobile portion 210 has a length of 2080 mm, height of 856 mm, the tubular profiles being 40 mm×60 mm. Still, each fixed portion has a length of 2080 mm, height of 870 mm, and the same profiles of the mobile portion, tubular profile of 40 mm×60 mm.

Moreover, this arrangement of the walls 21 enables the mobile portion 210 to pivot in relation to the fixed portion 220, making the transport of the device 100 safe, since the mobile portions 210 tilt/pivot, the total height of the device 100 reduces significantly, enabling better stability during transport. Besides, the side walls 21 are movable through the association of mechanism 214 with the first distal end 20' and the second distal end 20".

As complementary information, base 20 has a length of 2080 mm and width of 900 mm, and the platform 22 has a length of 2000 mm and width of 840 mm.

Preferred characteristics that may complement the device according to the invention are indicated ahead. The device may include one of these characteristics or a set of these characteristics combined.

The load cell 23 includes a weighing bar positioned across and beneath the weighing platform 22. The weighing bar includes a load cell 23 at each end.

It is worth emphasizing that the cables of the electronic devices of the identification module 1, are namely the cables of the solar panel 13, of the antenna 14, of the identifier 15 and of the amplifier and transmission box 24, in the processing module 12. It is also possible to identify each cable with the ring of a color so that the connection is made by the color of the cable ring.

The device 100, object of the present invention, also envisages cavities at base 20, since there are positioners welded in it. This cavity helps keep the load cells 23 always clean, and also eliminates the gap between the walls 21 and the platform 22 preventing the animal from getting hurt.

Since an example of preferred implementation has been described, it should be understood that the scope of the present invention covers other possible variations, being limited solely by the content of the attached claims, including the possible equivalents.

What is claimed is:

1. A mobile and modular device with movable walls for the dynamic weighing of a bovine animal, the mobile and modular device comprising:
    an identification module (1) including a support structure (11), a processing module (12), a solar panel (13), an antenna (14) and an identifier (15); and
    a weighing module (2) including a base (20), at least a pair of side walls (21), at least a weighing platform (22), at least a pair of load cells (23) and at least an amplifier and transmission box (24);
    wherein the processing module (12), the identifier (15), the solar panel (13) and the antenna (14) are associated on the support structure (11); and
    wherein the at least a weighing platform (22), the at least a pair of load cells (23) and the amplifier and transmission box (24) are associated on the base (20) in a fixed way; and
    wherein the at least a pair of side walls (21) includes a first side wall (21) and a second side wall (21) spaced from the first side wall (21) by a gap, wherein the first side wall (21) and the second side wall (21) define a passageway therebetween in the gap for movement of an animal across the at least a weighing platform and along the first side wall (21) and the second side wall (21), wherein the first side wall (21) is slidable along the base (20) toward the second side wall (21), such that the gap between the first side wall (21) and the second side wall (21) may be adjusted.

2. The device according to claim 1, characterized in that the processing module (12), the solar panel (13) and the antenna (14) are associated to a support (16) in a fixed way, and the support (16) is associated on the support structure (11).

3. The device according to claim 1, characterized in that each of the first side wall (21) and the second side wall (21) includes a fixed portion (220) and a mobile portion (210), wherein the fixed portion includes at least a central longitudinal cross bar (221), at least a cable (213) and at least a pair of fixed side cross bars (222) perpendicularly in relation to the base (20).

4. The device according to claim 3, characterized in that each mobile portion (210) comprises at least an upper cross bar (211), at least a pair of mobile side cross bars (212) and at least a cable (213).

5. The device according to claim 4, characterized in that the mobile portion (210) further comprises at least a rod disposed longitudinally between the at least a pair of mobile cross bars (212).

6. The device according to claim 3, characterized in that the mobile portion (210) is associated in a pivoting mode with the fixed portion (220) at the end of the at least a pair of fixed side cross bars (222) opposite the base (20).

7. The device according to claim 1, characterized in that the support structure is adjustable in response to an adjusted size of the gap.

8. The device according to claim 1, wherein the base (20) includes a first distal end (20') defining a first guide and a second distal end (20") defining a second guide, wherein the first side wall (21) is slidable along both the first guide and the second guide to adjust the gap.

9. The device according to claim 1, wherein the first side wall (21) includes a side cross bar (222) and a mechanism (214) coupled to the side cross bar (222), wherein the mechanism (214) is a bracket.

10. The device according to claim 9, wherein the base (20) includes a first distal end (20') that defines a guide, and wherein a portion of the bracket is configured to slide along the guide to adjust the gap.

11. The device according to claim 1, wherein the second side wall (21) is also slidable along the base (20) toward the first side wall (21).

\* \* \* \* \*